Dec. 10, 1968  K. KUHLMANN  3,415,310
APPARATUS FOR CONTROLLING THE TEMPERATURE AND OXYGEN
CONCENTRATION IN A COMPARTMENT
Filed June 26, 1967
2 Sheets-Sheet 1

Kurt Kuhlmann
INVENTOR
BY
Kolisch + Hartwell
Attys.

Dec. 10, 1968          K. KUHLMANN          3,415,310
APPARATUS FOR CONTROLLING THE TEMPERATURE AND OXYGEN
CONCENTRATION IN A COMPARTMENT
Filed June 26, 1967          2 Sheets-Sheet 2

Kurt Kuhlmann
INVENTOR
BY Kolisch & Hartwell
Attys.

United States Patent Office 3,415,310
Patented Dec. 10, 1968

3,415,310
APPARATUS FOR CONTROLLING THE TEMPERATURE AND OXYGEN CONCENTRATION IN A COMPARTMENT
Kurt Kuhlmann, Portland, Oreg., assignor to Industrial Air Products Co., Portland, Oreg., a corporation of Oregon
Filed June 26, 1967, Ser. No. 648,643
7 Claims. (Cl. 165—27)

ABSTRACT OF THE DISCLOSURE

Apparatus for controlling the temperature and oxygen concentration in a compartment including a source of liquefied inert gas, a conduit system for discharging such gas inside the compartment to vary the oxygen concentration therein, a conduit system for conveying gas through the compartment to cool the same, and control equipment for sensing the temperature and oxygen concentration in the compartment, and for regulating gas flow through the conduit systems whereby temperature and oxygen concentration in the compartment are maintained at certain predetermined levels.

---

The present invention relates to atmosphere control apparatus, and more particularly to such apparatus which utilizes a liquefied inert gas to control the temperature and oxygen concentration in a compartment.

For purposes of illustration only, the invention is described herein in connection with equipment used to store produce such as fresh fruits and vegetables. Thus, and to provide proper atmospheric conditions for storing such produce, apparatus is illustrated which is capable of maintaining oxygen concentration at various levels within a range of about ½% to 5% (by volume), and temperature of various levels within a range of about 32° to 45° F. It should be understood, however, that the invention is not limited to use with fresh produce, and that the control ranges indicated are merely representative of the invention's capabilities.

It is well known that produce of the type indicated spoils rapidly after picking if it is stored in an atmosphere having too high a temperature or too high an oxygen concentration. Further, it is known that such produce tends to deteriorate rapidly in the hours immediately after picking. Thus, if storage apparatus for such produce is to perform satisfactorily, there are a number of factors which must be considered.

To begin with, the apparatus should be capable of establishing a proper atmospheric condition in its storage compartment rapidly after produce is placed in it. Further, with a proper atmospheric condition once established, the apparatus should be capable of maintaining this condition substantially unchanged over extended periods of time. Thus, the system should be able not only to take care of the usual nominal heat and gas loss that occurs from the compartment, but should also be able to respond appropriately to any major loss of heat or gas.

In addition such apparatus should be capable of operating substantially fully automatically with minimal manual adjustment required. Also it should be relatively simple in construction so as to avoid excessive maintenance problems and to insure reliability.

Therefore, a general object of the present invention is to provide novel apparatus for controlling the temperature and oxygen concentration in a compartment which takes the above-indicated factors into account in a practical and satisfactory manner.

More particularly, an object of the invention is to provide such apparatus which employs a liquefied inert gas, such as liquid nitrogen, to control temperature and oxygen concentration in the compartment.

Another object is to provide such apparatus which operates automatically.

According to the invention, the apparatus includes a source of liquefied inert gas, a conduit system for discharging gas inside the compartment, and a conduit system for discharging gas inside the compartment, and a conduit system for conveying gas through the compartment and discharging it outside the compartment. The first-mentioned conduit system includes a heat exchanger mounted outside the compartment for warming gas to a temperature which is just slightly below that which is desired to be maintained in the compartment. The second-mentioned conduit system, on the other hand, includes a heat exchanger mounted inside the compartment for extracting heat from the compartment to cool it. Temperature and oxygen concentration sensors are mounted in the compartment, and novel control means is provided which is responsive to the sensors to control the flow of gas through the conduit systems.

When the oxygen concentration in the compartment exceeds a predetermined concentration level, gas is permitted to flow into the compartment through the first-mentioned conduit system to reduce the oxygen concentration. Similarly, when the temperature in the compartment rises above a predetermined temperature, gas is permitted to flow through the compartment through the second-mentioned conduit system to remove heat from the compartment.

According to one embodiment of the invention, normally-closed gate valves are provided, one for each of the above-mentioned conduit systems, which are adjustable to permit or prevent the flow of gas through the conduit systems. Gas flow through the conduit systems is therefore either fully on or fully off. Such apparatus responds rapidly to increases in temperature and oxygen concentration.

According to a modified form of the invention, infinitely-adjustable throttle valves are provided, one for each of the conduit systems. With such valves, gas flow is produceable through the conduit systems to take care of various demands for reduction of temperature or oxygen concentration. Such an organization functions very smoothly, and tends to maintain the temperature and the oxygen concentration at substantially constant levels in the compartment.

A further object and feature of the invention is that the conduit systems, valves, and control means are relatively simple in construction and reliable in operation.

These and other objects and advantages attained by the invention will become more fully apparent as the description which follows is read in conjunction with the accompanying drawings, wherein.

Figure 1:
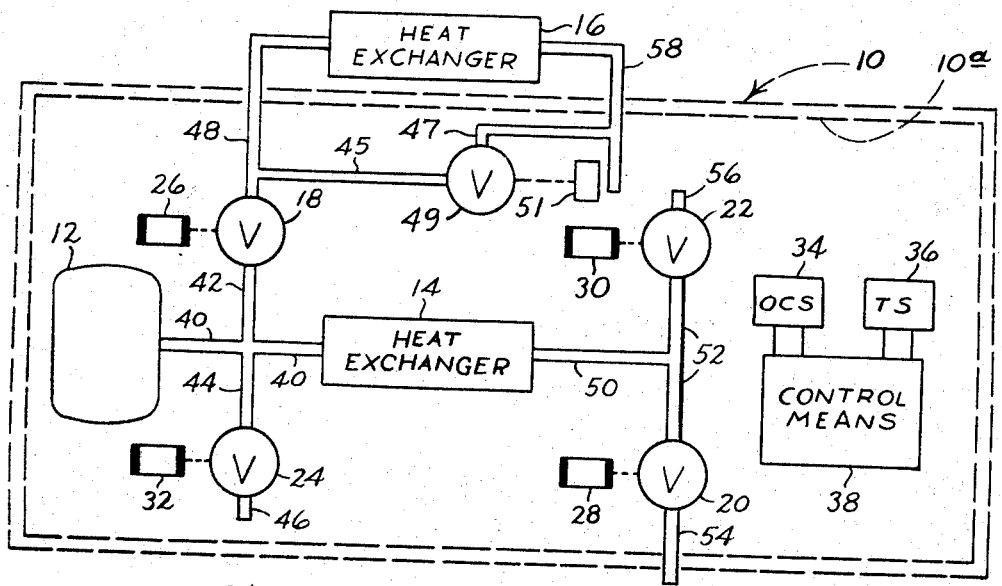
FIG. 1 is a schematic diagram, partly in block form, illustrating one embodiment of temperature and oxygen concentration control apparatus constructed according to the invention.

Turning now to FIG. 1, illustrated in dashed outline at 10 is an insulated-walled enclosure having a compartment 10a for storing articles such as fresh fruits and vegetables. The enclosure is represented only in block form herein since it is conventional, and may take any one of a number of different forms. For example, the enclosure might be a storage unit mounted on the ground or forming part of a building; or it might be the body of a trailer for hauling behind a truck. Enclosure 10 is provided with suitable doors or the like (not shown) for gaining access to compartment 10a.

Apparatus for controlling the temperature and oxygen concentration inside compartment 10a as contemplated herein includes a tank, or source, 12 for holding liquefied inert gas, such as liquid nitrogen, a pair of heat exchangers 14, 16, and solenoid-operated, normally-closed gate valves 18, 20, 22, 24. Valves 18, 20, 24 are referred to herein also as first, second and third valves, respectively. Valves 18, 20, 22, 24 are ganged to solenoids 26, 28, 30, 32 respectively.

The apparatus further includes an oxygen concentration sensor 34 and a temperature sensor 36. Sensors 34, 36 are each connected by a pair of electrical conductors to a control means 38 which also forms part of the apparatus.

Tank 12 is conventional, and includes the usual inlet (not shown) for admitting liquefied gas under pressure into the tank. The tank is suitably mounted inside the compartment. The outlet of tank 12 is connected through a conduit 40 to the inlet of heat exchanger 14. The outlet of the tank is further connected through conduit 40 and a pair of conduits 42, 44 to the inlets of valves 18, 24, respectively.

Connected to the outlet of valve 24 is a conduit 46 which communicates with the interior of compartment 10a. Conduits 44, 46 and valve 24 together comprise a third fluid passage means.

Connected to the outlet of valve 18 is a conduit 48 which extends to the outside of enclosure 10, and is connected to the inlet of heat exchanger 16.

Heat exchanger 14 is a conventional unit designed to exchange heat between fluid flowing through an internal path in the exchanger and the surrounding atmosphere. It is suitably mounted inside the compartment. The outlet of this heat exchanger is connected through a pair of conduits 50, 52 to the inlets of valves 20, 22. Connected to the outlet of valve 20 is a conduit 54 which extends through the wall of enclosure 10 and communicates with the atmosphere outside the enclosure. Connected to the outlet of valve 22 is a conduit 56 which communicates with the interior of the compartment. Conduits 40, 50, 52, 54, heat exchanger 14 and valve 20 together comprise a second fluid passage means herein.

Heat exchanger 16 is similar to heat exchanger 14, and is suitably mounted on the outside of enclosure 10. Connected to the outlet of this heat exchanger is a conduit 58 which extends inwardly through the wall of the enclosure and communicates with the interior of the compartment. Conduits 42, 48, 58, valve 18 and heat exchanger 16 together form which is called a first fluid passage means herein.

Connecting conduits 48, 58 inside the compartment are a pair of conduits 45, 47 and a normally-closed gate valve 49. Valve 49 is suitably ganged to a conventional electromechanical thermostat device 51 which is responsive to the temperature of fluid flowing through conduit 58. Device 51 is adjusted so that when the temperature of such fluid equals or exceeds the temperature which is desired to be maintained in the compartment, it opens valve 49. At lower temperatures, valve 49 remains closed.

Figure 2:
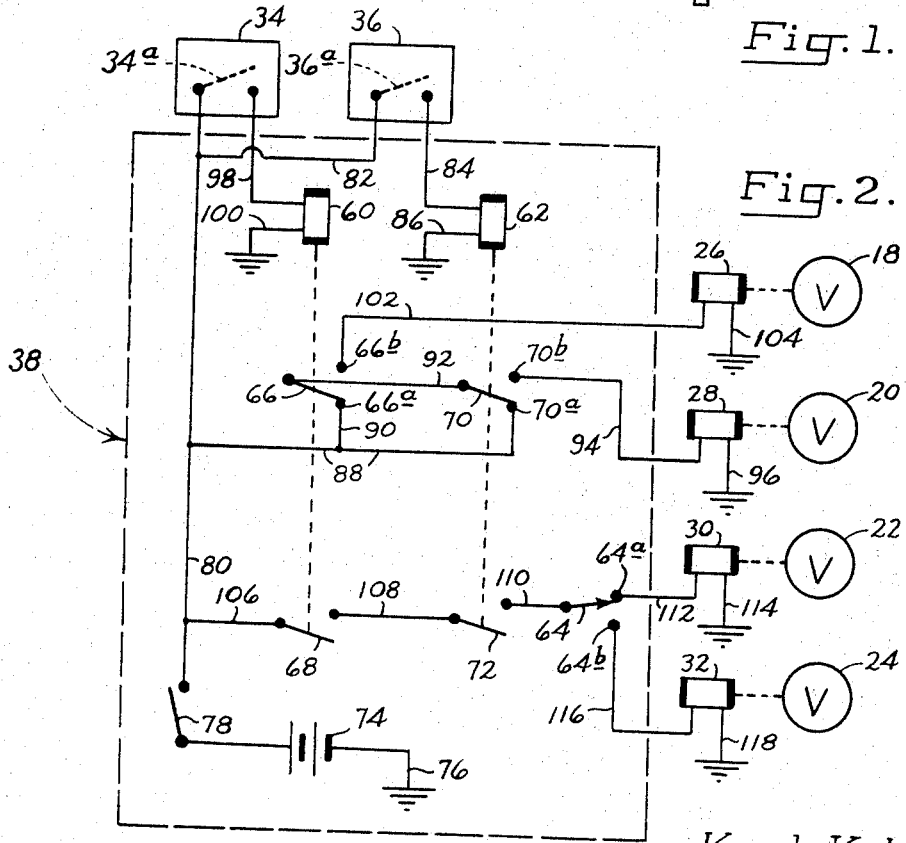
FIG. 2 is a schematic diagram illustrating a control means employed in the apparatus of FIG. 1.

Describing the construction and operation of the sensors in greater detail, and considering sensor 34, this is a conventional unit for monitoring the concentration (on a volume basis) of oxygen in the atmosphere surrounding the sensor. The unit is provided with the usual means (not shown) for establishing a so-called "set point" which represents a predetermined oxygen concentration or level, called herein a set point concentration. The set point concentration is also referred to herein as a predetermined concentration. Sensor 34 may be thought of as including a normally open switch 34a (FIG. 2). Once a set point has been established, sensor 34 functions, upon sensing an oxygen concentration which is equal to or greater than the set point concentration, to close switch 34a.

Temperature sensor 36 is likewise a conventional unit, and is similar in many respects to sensor 34. It also includes means (not shown) for establishing a "set point" representing a predetermined or set point temperature level. Sensor 36 may be thought of as including a normally open switch 36a (FIG. 2) which is closed whenever the sensor detects a temperature that is equal to or greater than the set point temperature.

Considering the construction of control means 38, and referring particularly to FIG. 2, the control means includes a pair of solenoids 60, 62, and a manually-operable selector switch 64 having a pair of terminals 64a, 64b.

Solenoid 60 is ganged to a pair of switches including a single-pole double-throw switch 66 having terminals 66a, 66b, and a single-pole single-throw switch 68. The wipers of the switches are shown in positions that they occupy with solenoid 60 nonenergized. In particular, the wiper of switch 66 is closed upon terminal 66a, and switch 68 is open.

Solenoid 62 is ganged to a pair of switches 70, 72 which are similar to switches 66, 68, respectively. Thus, switch 70 has a pair of terminals 70a, 70b, and, with solenoid 62 nonenergized, the wiper of switch 70 is closed upon terminal 70a, and switch 72 is open.

Power for operating the various solenoids 26, 28, 30, 32, 60, 62 is supplied from any suitable source of electrical power, such as battery 74. The negative terminal of the battery is grounded at 76. The positive terminal is connected through a supply switch 78 to a main power supply conductor 80.

The various conductors interconnecting the parts of the control means, and connecting the control means to sensors 34, 36, will be described in connection with the explanation which follows of the operation of the apparatus as a whole.

Assuming that tank 12 contains a supply of pressurized liquefied inert gas, such as liquid nitrogen, and that appropriate set points have been established for the sensors, switch 78 is closed to supply positive voltage to conductor 80, and to make the apparatus operable. The set points of the sensors are selected to represent temperature and oxygen concentration levels closely below which it is desired to maintain the actual temperature and oxygen concentration in the compartment. Initially, all valves are closed, all solenoids are nonenergized, and the wipers of switches 66, 68, 70, 72 are in the positions in which they are shown in FIG. 2. The wiper of selector switch 64 is closed upon treminal 64a (as shown in FIG. 2).

To simplify the operational description, the temperature in compartment 10a will be referred to as being above, at or below set point, it being understood that the term "set point" refers to the set point temperature of sensor 36. Similarly, the oxygen concentration in the compartment will be referred to as being above, at or below set point, the latter term referring to the set point concentration of sensor 34.

Under circumstances where both the temperature and the oxygen concentration in compartment 10a are below their respective set points (a situation which exists whenever the atmospheric condition in the compartment is proper), no changes occur in the parts of the apparatus, and there is no gas flow out of tank 12.

Under circumstances, however, where the oxygen concentration in the compartment is below set point, but the temperature is at or above set point, switch 36a closes. When this occurs, power is supplied from conductor 80 to solenoid 62 through a circuit including a conductor 82, switch 36a, a conductor 84, solenoid 62, and a conductor 86 which is connected to ground. With energizing of solenoid 62, switch 72 closes, and the wiper of switch 70 closes upon terminal 70b.

Closing of switch 72 at this time causes no further change to occur in the apparatus. However, with such operation of switch 70, power is supplied from conductor 80 to solenoid 28 through a circuit including a pair of conductors 88, 90, switch 66, a conductor 92, switch 70, a conductor 94, solenoid 28, and a conductor 96 which is connected to ground. With energizing of solenoid 28, gate valve 20 opens.

Referring to FIG. 1, upon opening of valve 20, gas flows out of tank 12 through conduit 40, heat exchanger 14, conduits 50, 52, valve 20 and conduit 54. From conduit 54 gas is discharged outside of enclosure 10. As gas flows through heat exchanger 14, it removes heat from the inside of compartment 10a and thus lowers the temperature in the compartment.

Such gas flow continues until the temperature in the compartment drops below the set point temperature. When this occurs, switch 36a again opens, solenoids 62, 28 are de-energized, and valve 20 again closes to terminate the flow of gas through the compartment.

Considering now the situation where the temperature in the compartment is below set point, but the oxygen concentration is at or above set point, switch 34a closes. When this occurs, power is supplied from conductor 80 to solenoid 60 through a circuit including switch 34a, a conductor 98, solenoid 60, and a conductor 100 which is connected to ground. With energizing of solenoid 60, switch 68 closes, and the wiper of switch 66 closes upon terminal 66b.

Closing of switch 68 at this time causes no further change to occur in the apparatus. However, such operation of switch 66 causes power to be supplied from conductor 80 to solenoid 26 through a circuit including conductor 88, switch 70, conductor 92, switch 66, a conductor 102, solenoid 26 and a conductor 104 which is connected to ground. With power supplied to solenoid 26, valve 18 opens.

Referring again to FIG. 1, opening of valve 18 permits gas to flow from tank 12 through conduits 40, 42, valve 18, conduit 48, heat exchanger 16, and conduit 58. From conduit 58, gas is discharged directly into compartment 10a to reduce the oxygen concentration therein.

As gas flows through heat exchanger 16, it absorbs heat from the atmosphere outside the enclosure, and is warmed. If the temperature of gas flowing out of conduit 58 rises to or above the set point temperature, thermostat device 51 opens valve 49 to admit gas directly from conduit 48 to conduit 58, thus by-passing the heat exchanger. This maintains the temperature of gas flowing into the compartment below the set point temperature.

Such gas flow continues until the oxygen concentration in the compartment drops below the set point concentration. When this occurs, switch 34a again opens, solenoids 60, 26 are de-energized, and valve 18 again closes to terminate the flow of gas into the compartment.

Describing now what occurs when both the temperature and the oxygen concentration in the compartment are at or above their respective set points, switches 34a, 36a both close. When this occurs, solenoids 60, 62 are both energized (through the same circuits described above), switches 68, 72 close, and the wipers of switches 66, 70 close upon terminals 66b, 70b, respectively.

Operation of switches 66, 70 at this time has no further effect upon the apparatus. However, closing of switches 68, 72 together does have an effect. More particularly, closing of the latter-mentioned switches completes a circuit from supply conductor 80 to solenoid 30. This circuit includes a conductor 106, switch 68, a conductor 108, switch 72, a conductor 110, switch 64, a conductor 112, solenoid 30, and a conductor 114 which is connected to ground. With energizing of solenoid 30, valve 22 opens.

Referring to FIG. 1, upon opening of valve 22, gas flows from tank 12 through conduit 40, heat exchanger 14, conduits 50, 52, valve 22, and conduit 56. From conduit 56 gas is discharged directly into compartment 10a. As gas flows through heat exchanger 14, it absorbs heat from the compartment and causes the temperature therein to drop. Further, with discharge of the gas directly into the compartment through conduit 56, the oxygen concentration in the compartment also drops.

As gas flows in the manner described, if both the temperature and the oxygen concentration drop below their respective set points simultaneously, then switches 34a, 36a open simultaneously, solenoids 60, 62, 30 become de-energized, and valve 22 closes. The flow of gas from tank 12 then completely stops.

If, however, either the oxygen concentration or the temperature in the compartment drops below its set point first, then, either switch 34a, or switch 36a opens first, and the apparatus performs as earlier described with the other sensor's switch closed. When both the oxygen concentration and the temperature are again below their set points, all gas flow from tank 12 is cut off.

Considering now the situation where both the oxygen concentration and the temperature are at or above their respective set points, and the wiper of switch 64 is closed upon terminal 64b, instead of upon terminal 64a, switches 34a, 36a both close. When this occurs, relays 60, 62 are both energized, switches 68, 72 close, and the wipers of switches 66, 70 close upon terminals 66b, 70b, respectively.

Such operation of switches 66, 70 at this time causes no other change in the apparatus. However, closing of switches 68, 72 together completes a circuit which supplies power from conductor 80 to solenoid 32. This circuit includes conductor 106, switch 68, conductor 108, switch 72, conductor 110, switch 64, a conductor 116, solenoid 32, and a conductor 118 which is connected to ground. Energizing of solenoid 32 causes valve 24 to open.

Referring again to FIG. 1, upon opening of valve 24, gas flows from tank 12 through conduits 40, 44, valve 24 and conduit 46. From conduit 46 gas is discharged directly into the compartment to lower both the temperature and the oxygen concentration therein. When both the temperature and the oxygen concentration have dropped below their respective set points, all gas flow from the tank through conduit 46 into the compartment is stopped.

Discharge of gas into the compartment through conduit 46 produces a somewhat faster reduction of temperature and oxygen concentration in the compartment than does discharge through conduit 56 (earlier described). Rapid adjustment of atmospheric conditions in the compartment is often desirable, for example, immediately after fresh produce is placed in the compartment and the compartment closed.

Figure 3:
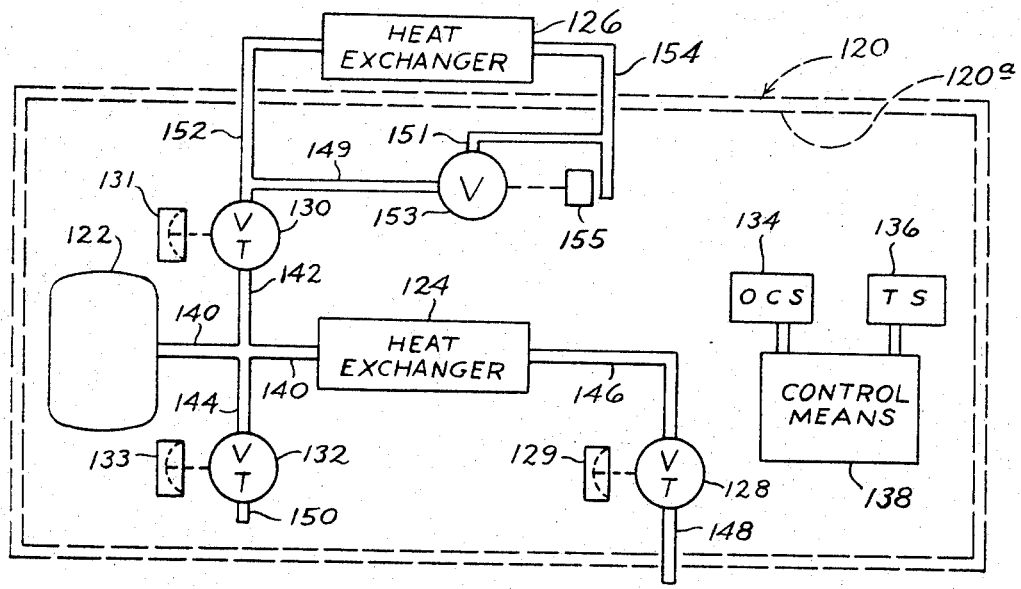
FIG. 3 is a schematic diagram illustrating a modified form of the invention.
Figure 4:
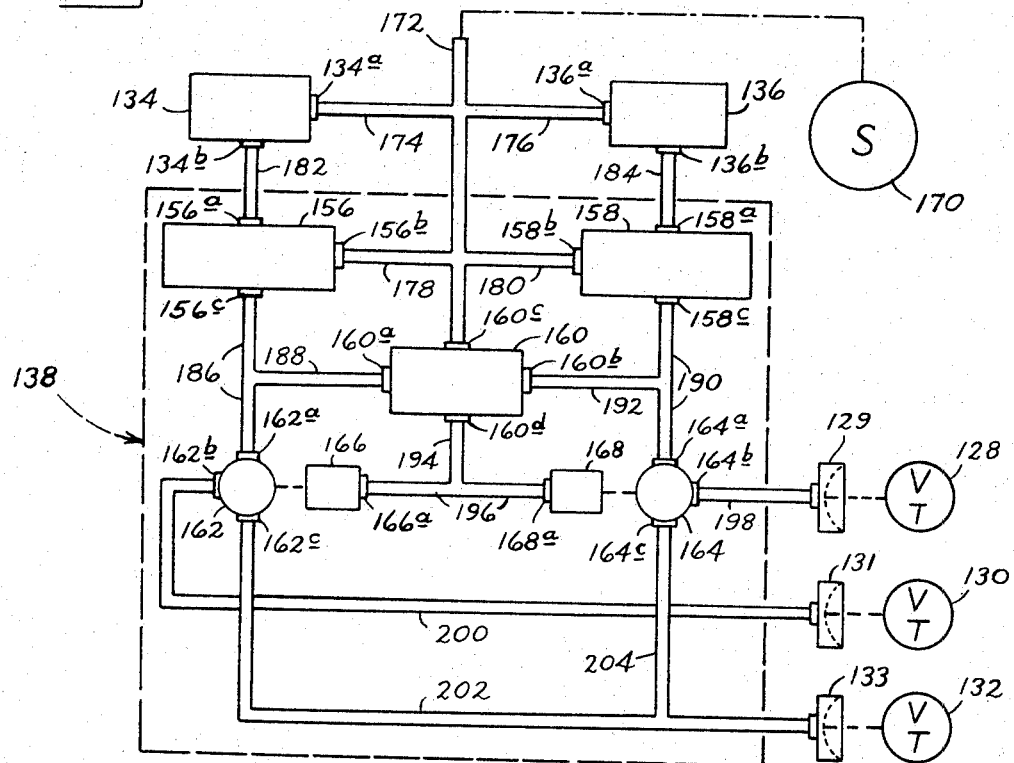
FIG. 4 is a schematic diagram illustrating control means employed in the modification of FIG. 3.

Turning now to FIGS. 3 and 4 which illustrate a modified form of the invention, at 120 in dashed outline is an enclosure similar to enclosure 10 having a compartment 120a which is similar to compartment 10a.

Apparatus for controlling the temperature and oxygen concentration inside compartment 120a includes a tank, or source, 122 for storing pressurized liquefied gas. This tank is similar to previously-described tank 12, and is suitably mounted inside the compartment. The apparatus also includes a pair of heat exchangers 124, 126, which are similar to previously-described exchangers 14, 16, suitably mounted inside and outside, respectively, of the enclosure, and diaphragm-operated, infinitely-adjustable, normally-closed throttle valves 128, 130, 132. Valves 128, 130, 132 are also referred to herein as second, first and third valves, respectively. Valves 128, 130, 132 are ganged to suitable air-pressure-operated diaphragm devices 129, 131, 133, respectively.

Devices 129, 131, 133 are conventional, and are provided with suitable inlets for receiving pressurized air. These devices operate in a similar manner, and considering device 129, with air at substantially atmospheric pressure supplied to its inlet, the device remains non-operated, and valve 128 remains fully closed. With air at a greater pressure supplied to the inlet, the device operates, and opens valve 128 by an amount related to the difference between the pressure at the inlet and atmospheric pressure.

Also forming part of the apparatus is an oxygen concentration sensor 134, a temperature sensor 136 and a control means 138.

Further describing the apparatus, the outlet of tank 122 is connected to the inlet of heat exchanger 124 through a conduit 140. The tank's outlet is also connected to the inlets of valves 130, 132 through conduit 140 and a pair of conduits 142, 144, respectively.

The outlet of heat exchanger 124 is connected through a conduit 146 to the inlet of valve 128, and the outlet of this valve is connected in turn to a conduit 148 which extends to the outside of enclosure 120. Conduits 140, 146, 148, heat exchanger 124 and valve 128 together comprise what is called a second fluid passage means herein.

The outlet of valve 132 communicates with the interior of the compartment through a conduit 150. And conduits 144, 150 and valve 132 comprise a third fluid passage means herein. The outlet of valve 130 is connected to the inlet of heat exchanger 126 by a conduit 152 which extends through the wall of the enclosure. The outlet of this heat exchanger communicates with the interior of the compartment through a conduit 154 which also extends through the wall of the enclosure. Conduits 142, 152, 154, valve 130 and heat exchanger 126 are referred to herein collectively as a first fluid passage means.

Connecting conduits 152, 154 inside compartment 120a are conduits 149, 151 and a normally-closed gate valve 153. Valve 153 is suitably ganged to a thermostat device 155 which is similar to previously-described device 51 (FIG. 1). Device 155 is responsive to the temperature of fluid flowing out of conduit 154. Device 155 is adjusted so that when the temperature of such fluid equals or exceeds the temperature desired to be maintained in the compartment, it opens valve 153. At lower temperatures, valve 153 remains closed.

Turning now to FIG. 4, and considering the sensors in greater detail, oxygen concentration sensor 134 is formed from conventional air-pressure-operated equipment which is well known to those skilled in the art, and includes an air inlet 134a and an air outlet 134b. The sensor is provided with the usual means (not shown) for establishing a "set point" which represents a predetermined oxygen concentration level, called herein a set point concentration.

The sensor is responsive to a range of oxygen concentrations, and with air at a substantially constant pressure supplied to inlet 134a, the sensor supplies air at outlet 134b having a pressure which is directly related to the oxygen concentration sensed by the sensor.

Sensor 134 is adjusted so that its set point concentration falls about midway in the range of concentrations that it responds to, and so that the set point concentration corresponds to the particular oxygen concentration which is desired to be maintained in compartment 120a. When the sensor senses an oxygen concentration that is equal to the set point concentration, it supplies air at outlet 134b having a pressure which is called herein the set point output pressure for the sensor. The amount by which the actual oxygen concentration in the compartment exceeds the set point concentration at any moment, will be referred to hereinafter as the oxygen concentration spread.

Temperature sensor 136 is also formed of conventional equipment which is well known, and includes an air inlet 136a and an air outlet 136b. Like sensor 134, sensor 136 includes conventional means (not illustrated) for establishing a "set point" which corresponds to a predetermined temperature level called herein a set point temperature.

The temperature sensor is responsive to a range of temperatures, and with air at a substantially constant pressure supplied to inlet 136a, the sensor supplies air at outlet 136b having a pressure which is directly related to the temperature sensed by the sensor.

Sensor 136 is adjusted so that its set point temperature falls approximately midway in the above-mentioned range of temperatures, and corresponds to the temperature which is desired to be maintained in the compartment. When the sensor senses a temperature that is equal to the set point temperature, it supplies air at outlet 136b having an output pressure which is called herein the set point output pressure for the sensor. The amount by which the actual temperature in compartment 120a exceeds the set point concentration at any time, will be referred to hereinafter as the temperature spread.

Considering now control means 138, it includes a pair of control devices 156, 158, a differential air-pressure-responsive valving device 160, and a pair of valves 162, 164 ganged to air-operated motors 166, 168, respectively.

Control devices 156, 158 are conventional pieces of air-operated equipment which are known in the art as proportional and reset controllers. Many different manufacturers make such controllers, and as an example, the Minneapolis Honeywell Regulator Company makes a device of the type indicated which it calls a two-mode adjustable-band "Tel-O-Set" controller.

Devices 156, 158 are similar to one another, and include air inlets 156a, 158a, air inlets 156b, 158b and air outlets 156c, 158c, respectively. The devices also include conventional means (not shown) which, with air at a substantially constant pressure supplied at inlets 156b, 158b, are operable to establish substantially constant reference pressures in the devices.

Such reference pressures, during operation of the apparatus, are compared in the devices to the air pressures existing at inlets 156a, 158a. Device 156 is adjusted to have a reference pressure that equals the set point output pressure of sensor 134. Device 158 is adjusted to have a reference pressure which equals the set point output pressure of sensor 136.

Describing generally how devices 156, 158 function herein, and considering device 156, as will become more fully apparent, the pressure of air supplied to inlet 156a is directly related to the oxygen concentration in compartment 120a. And this pressure equals the established reference pressure for the device whenever the oxygen concentration in the compartment exactly equals the set point concentration. As will also become apparent, the pressure of air at outlet 156c is related to, and to a great extent determines, the rate at which gas flows into the compartment to control the oxygen concentration therein. Generally speaking, the greater this output pressure, the greater is the rate of gas flow into the compartment.

With air at a substantially constant pressure supplied to inlet 156b, the device supplies pressurized air at outlet 156c which adjusts the rate of gas flow into the compartment, whereby the oxygen concentration therein tends to remain at the set point concentration, and the air pressure at inlet 156a tends to remain equal to the device's reference pressure. Whenever the pressure at inlet 156a differs from the reference pressure (which will occur whenever the compartment's oxygen concentration differs from the set point concentration) the device adjusts the gas flow into the compartment (through adjustment of its air output pressure at outlet 156c) to reduce such differences to zero.

It will be apparent, therefore, that device 156 is not only responsive to any differences that exist between the actual and desired (set point) oxygen concentration in compartment 120a, but also is responsive to the rate at which the oxygen concentration in the compartment tends to change. Thus, the device tends continually to maintain a sufficient flow of gas into the compartment to hold the oxygen concentration substantially constant at the predetermined set point concentration.

Device 158 performs in a similar manner with respect to temperature. More specifically, it tends continually to maintain a sufficient flow of gas through compartment 120a, to hold the temperature therein substantially constant at the predetermined set point temperature.

Further operational details of devices 156, 158 will be described when the operation of the apparatus of FIGS. 3, 4 as a whole is explained.

Valving device 160 is conventional, and includes a pair of opposed ports 160a, 160b, an inlet 160c and an outlet 160d. Considering how device 160 operates, with pressurized air supplied to inlet 160c, if the air pressure existing at port 160a exceeds that at port 160b, the device provides air at outlet 160d at or nearly at atmospheric pressure. On the other hand, if the pressure at port 160b exceeds that at port 160a, air is provided at outlet 160d having substantially the same pressure as air at inlet 160c.

Valve 162 includes an inlet 162a and a pair of outlets 162b, 162c. The valve spool of the valve is biased to a position where inlet 162a normally communicates with outlet 162b, and outlet 162c is closed off. Upon operation of motor 166, the valve spool is shifted to a position where inlet 162a communicates with outlet 162c, and outlet 162b is vented to the atmosphere.

Valve 164 includes an inlet 164a and a pair of outlets 164b, 164c. The valve spool of valve 164 is biased to a position where inlet 164a normally communicates with outlet 164c, and outlet 162b is vented to the atmosphere. Upon operation of motor 168, the valve spool is shifted to a position where inlet 164a communicates with outlet 164b, and outlet 164c is closed off.

Air motors 166, 168 have the usual air inlets 166a, 168a, respectively. The motors are operated upon air having sufficient pressure above atmospheric pressure being supplied to their inlets.

Further describing FIG. 4, at 170 is a suitable source of pressurized air which is connected to a main air supply line 172. Line 172 is connected to sensor inlets 134a, 136a through conduits 174, 176, respectively, and to control device inlets 156b, 158b through conduits 178, 180, respectively. Line 172 is connected directly to inlet 160c of the valving device.

Outlets 134b, 136b of the sensors are connected to inlets 156a, 158a, respectively, through conduits 182, 184, respectively. Outlet 156c is connected to valve inlet 162a through a conduit 186, and is further connected to port 160a through conduit 186 and a conduit 188. Outlet 158c is connected to valve inlet 164a through a conduit 190, and is also connected to port 160b through conduit 190 and a conduit 192.

Outlet 160d of the valving device is connected by a pair of conduits 194, 196 to the inlets of motors 166, 168.

Valve outlet 164b is connected to the inlet of diaphragm device 129 through a conduit 198. Similarly, valve outlet 162b is connected to the inlet of diaphragm device 131 through a conduit 200. The inlet of diaphragm device 133 is connected to valve outlet 162c through a conduit 202, and is further connected to valve outlet 164c through conduit 202 and a conduit 204.

Explaining now how the apparatus shown in FIGS. 3 and 4 operates as a whole, air at a substantially constant pressure is provided by source 170, and is supplied to the sensors, control devices and valving device in the apparatus by conduits 172, 174, 176, 178, 180.

Let us assume first that both the oxygen concentration and the temperature in compartment 120a are above their desired levels (i.e., above the set point levels of sensors 134, 136, respectively). Let us assume further that, at the moment, the demand for gas flow to adjust the oxygen concentration in the compartment is greater than the demand for gas flow to adjust the temperature. Such a condition could result either from the oxygen concentration spread (earlier mentioned) exceeding the temperature spread, or from the rate of oxygen loss from the compartment exceeding the rate of heat loss therefrom; or it could result from a combination of the two circumstances.

Under such a condition, the pressure of air in conduit 186 (supplied from outlet 156c) exceeds that in conduit 190 (supplied from outlet 158c). Hence, a greater pressure exists at port 160a than at port 160b of device 160, and as a result, as earlier explained, the device provides air at outlet 160d at atmospheric pressure. Under such circumstances, motors 166, 168 do not operate, and the valve spools of valves 162, 164 remain in the positions to which they are normally biased.

With the valve spools of valves 162, 164 in these positions, pressurized air is supplied from conduit 186 through valve 162 and conduit 200 to the inlet of diaphragm device 131. Additionally, pressurized air is supplied from conduit 190 through valve 164 and conduits 204, 202 to the inlet of diaphragm device 133.

With air thus supplied to device 131, the device operates and opens throttle valve 130 by an amount directly related to the difference between the pressure in conduit 200 and atmospheric pressure. Similarly, with pressurized air supplied to device 133, it operates and open valve 132 by an amount directly related to the difference between atmospheric pressure and the pressure in conduit 202.

Referring to FIG. 3, with valve 130 open, gas flows from tank 122 through conduits 140, 142, valve 130, conduit 152, heat exchanger 126, and conduit 154. From conduit 154 gas is discharged directly into compartment 120a to reduce the oxygen concentration therein.

As gas flows through heat exchanger 126, it absorbs heat from the atmosphere outside the enclosure, and is warmed. If the temperature of such gas in conduit 154 equals or exceeds the set point temperature, thermostat device 155 opens valve 153 to admit gas directly from conduit 152 into conduit 154. This mixes with gas flowing through the heat exchanger to produce a mixture having a temperature which is below the set point temperature.

Simultaneously, with valve 132 open, gas flows from tank 122 through conduits 140, 144, valve 132 and conduit 150. From conduit 150 gas is discharged into compartment 120a. Such gas flow produces both cooling and oxygen concentration reduction in the compartment.

Thus, with both temperature and oxygen concentration above their set point levels, but with the demand for adjustment of the latter exceeding the demand for adjustment of the former, gas flow is produced which, while causing adjustment of both, causes primarily adjustment of the latter.

Further describing the operation of the apparatus, let us assume that, as gas flows through valves 130, 132 in the manner described, to reduce the temperature and oxygen concentration, the demand for oxygen concentration adjustment remains dominant. If the oxygen concentration initially approaches the set point concentration relatively slowly (indicating that the gas flow is just barely sufficient to correct the oxygen concentration), then control device 156 increases the pressure of air supplied to conduit 186. This causes valve 130 to open further to increase the rate of gas flow into the compartment. In particular, the gas flow is increased to produce a moderate rate of oxygen concentration reduction.

If, on the other hand, the oxygen concentration initially approaches the set point concentration very rapidly (indicating that gas flow is producing a too rapid correction of the oxygen concentration), then device 156 reduces the pressure in conduit 186 to close valve 130 until a moderate rate of oxygen concentration reduction is attained.

As the oxygen concentration approaches and finally reaches the set point concentration, the air pressure in conduit 186 reaches a level which is directly related to the rate of gas flow into the compartment which is required to maintain the oxygen concentration at this level. More particularly, once the desired concentration level is reached, if only a small gas flow into the compartment is required to maintain this level (for example, to take care of normal leakage), there is a relatively low air pressure in conduit 186 and valve 130 is held only slightly open. If, however, a greater gas flow is required, the air pressure in conduit 186 is somewhat higher, and valve 130 is held somewhat more open.

As such operation takes place for valve 130, a similar operation takes place for valve 132. The extent to which valve 132 opens depends upon the pressure in conduit 190. This pressure, in turn, depends upon the rate of gas flow, as determined by control device 158, required to reduce the temperature in the compartment to the set point temperature.

Let us assume now a situation where the demand for gas flow to adjust the temperature in the compartment is greater than that required to adjust the oxygen concentration. In this case, the pressure in conduit 190 exceeds that in conduit 186, and therefore the pressure at port 160b exceeds that at port 160a. Thus, device 160 provides air at outlet 160d at a pressure which is the same as the air pressure at inlet 160c (the pressure of supply 170).

Pressurized air is thus supplied through conduits 194, 196, and this air operates motors 166, 168 simultaneously. On operation of these motors, the valve spools of valves 162, 164 are actuated to connect valve inlets 162a, 164a with outlets 162c, 164b, respectively.

With actuation of the valve spools, air is supplied from conduit 190 through valve 164 and conduit 198 to the inlet of diaphragm device 129. This causes valve 128 to open by an amount directly related to the difference between the air pressure in conduit 198 and atmospheric pressure. Additionally, air is supplied from conduit 186 through valve 162 and conduit 202 to the inlet of diaphragm device 133. This causes valve 132 to open to an extent directly related to the difference between atmospheric pressure and the pressure in conduit 202.

Referring to FIG. 3, with valve 128 open, gas flows from tank 122 through conduit 140, heat exchanger 124, conduit 146, valve 128, and conduit 148. From conduit 148, gas is discharged into the atmosphere outside of enclosure 120. With such flow of gas through heat exchanger 124, heat is removed from the compartment and the temperature therein drops.

With valve 132 open, gas flows from the tank through conduits 140, 144, valve 132 and conduit 150. From conduit 150 gas is discharged directly into the compartment. As earlier mentioned, such gas flow reduces both the oxygen concentration and the temperature inside the compartment.

With such gas flow occurring through valves 128, 132, both the temperature and the oxygen concentration are lowered in the compartment, although it is primarily temperature reduction that takes place. The operation of control devices 156, 158 in controlling valves 132, 128 with the demand for temperature reduction dominant, is similar to their earlier-described operation in controlling valves 130, 132 wtih the demand for oxygen concentration reduction dominant.

Thus, the invention provides novel apparatus for controlling automatically the oxygen concentration and temperature inside a compartment.

With a liquified inert gas used as described, the apparatus is capable of a rapid initial reduction of temperature and oxygen concentration after a compartment is first closed, and it is capable further of maintaining the temperature and oxygen concentration at substantially constant desired levels in the compartment. Such control is accomplished with a minimum amount of manual adjustment.

The apparatus may be constructed to maintain the temperature and oxygen concentration at various desired levels, depending on the particular application.

While embodiments of the invention have been described wherein, it is appreciated that variations and modifications may be made without departing from the spirit of the invention. For example, in the control means illustrated, electrical circuits could readily be replaced by fluid circuits, and vice versa. In the various circuits shown, pressurized liquid, or gas vapor from tanks 12, 122, could be employed instead of air. Further, while the modification of FIGS. 3 and 4 has been described in connection with proportional and reset control devices (156, 158), commercially available units which are known as proportional control devices could easily be substituted.

Accordingly, it is desired to cover all such variations and modifications that would be apparent to those skilled in the art, and which come within the scope of the appended claims.

It is claimed and desired to secure by Letters Patent:

1. Apparatus for controlling the temperature and oxygen concentration in a compartment, said apparatus in operative condition comprising a source of liquefied inert gas, a temperature sensor in the compartment, an oxygen concentration sensor in the compartment, first fluid passage means for conveying gas from the source to the compartment adapted to discharge gas inside the compartment, including a first valve which is adjustable to regulate the flow of gas through said first fluid passage means, second fluid passage means for conveying gas from the source through the compartment adapted to discharge gas outside the compartment, including a second valve which is adjustable to regulate the flow of gas through said second fluid passage means, and control means responsive to said temperature and oxygen concentration sensors, operatively connected to said valves, operable, when said oxygen concentration sensor senses an oxygen concentration in the compartment above a predetermined concentration level, to adjust said first valve whereby gas flows into the compartment to reduce the oxygen concentration therein, said control means being further operable, when said temperature sensor senses a temperature in the compartment above a predetermined temperature level, to adjust said second valve whereby gas flow through the compartment to reduce the temperature therein.

2. The apparatus of claim 1, wherein said second fluid passage means includes a heat exchanger mounted inside the compartment through which heat is extracted from the compartment when gas flows through said second fluid passage means.

3. The apparatus of claim 2, wherein said first fluid passage means includes a heat exchanger mounted outside the compartment for warming gas as such flows through said first fluid passage means.

4. The apparatus of claim 3 which further comprises third fluid passage means for conveying gas from the source to the interior of the compartment, including a third valve adjustable to regulate the flow of gas through said third fluid passage means.

5. The apparatus of claim 4, wherein said first valve comprises a normally-closed gate valve which is opened by said control means upon the oxygen concentration sensor sensing an oxygen concentration in the compartment above said predetermined concentration level, and said second valve comprises a normally-closed gate valve which is opened by said control means upon the temperature sensor sensing a temperature in the compartment which is above said predetermined temperature level.

6. The apparatus of claim 5, wherein said third valve comprises a normally-closed gate valve operatively connected to said control means, and said control means is further operable, upon said temperature sensor sensing a temperature in the compartment above said predetermined temperature level, and said oxygen concentration sensor sensing an ogygen concentration in the compartment above said predetermined concentration level, to open said third valve.

7. The apparatus of claim 4, wherein said first, second and third valves comprise adjustable throttle valves, and said control means operates to adjust said valves to such positions whereby gas flows through said first, second and third fluid passage means to maintain the temperature and oxygen concentration in the compartment substantially constant at said predetermined levels.

References Cited

UNITED STATES PATENTS

| | | | |
|---|---|---|---|
| 1,798,781 | 3/1931 | Brooks | 62—78 |
| 2,130,430 | 9/1938 | Maginnis | 62—78 |
| 2,318,576 | 5/1943 | Arnold | 62—78 |
| 3,102,777 | 9/1963 | Bedrosion | 67—78 |
| 3,166,913 | 1/1965 | Carter | 62—78 |
| 3,307,618 | 3/1967 | Hogenauer | 165—27 |

WILLIAM J. WYE, *Primary Examiner.*

U.S. Cl. X.R.

62—78; 165—30; 99—189, 192